United States Patent
Chen et al.

(10) Patent No.: US 10,062,159 B2
(45) Date of Patent: Aug. 28, 2018

(54) METHOD FOR LOCATING A UNIT IN AN ASSEMBLY

(71) Applicant: International Business Machines Corporation, Armonk, NY (US)

(72) Inventors: Kai C K Chen, Shanghai (CN); Zhen Yu Ge, Shanghai (CN); Adrian X. Rodriguez, Durham, NC (US); Wen Wei Tang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 14/918,836

(22) Filed: Oct. 21, 2015

(65) Prior Publication Data

US 2016/0042506 A1   Feb. 11, 2016

Related U.S. Application Data

(63) Continuation of application No. 14/697,899, filed on Apr. 28, 2015, now Pat. No. 9,953,410.

(30) Foreign Application Priority Data

Apr. 29, 2014   (CN) .......................... 2014 1 0178187

(51) Int. Cl.
*G06K 9/00* (2006.01)
*G06T 7/00* (2017.01)
*G06T 7/70* (2017.01)

(52) U.S. Cl.
CPC .............. *G06T 7/0008* (2013.01); *G06T 7/70* (2017.01); *G06K 9/00* (2013.01);
(Continued)

(58) Field of Classification Search
CPC ......... G06T 2207/10004; G06T 7/0008; G06T 7/70; G06T 2207/30141; G06T 7/004;
(Continued)

(56) References Cited

U.S. PATENT DOCUMENTS 6,240,633 B1 * 6/2001 Kent ...................... H05K 13/08
29/707
7,168,007 B2   1/2007 Gilstrap et al.
(Continued)

OTHER PUBLICATIONS

Anonymous, Method for aggregating Light Path Diagnostics status across multiple servers, IP.com, Oct. 22, 2004.
(Continued)

*Primary Examiner* — Aklilu Woldemariam
(74) *Attorney, Agent, or Firm* — Lieberman & Brandsdorfer, LLC

(57) ABSTRACT

The present embodiments disclose a method for locating a unit in an assembly. According to the embodiments, a unit in an assembly is located. An identification of the target unit in the assembly is obtained. An image of at least a part of the assembly is acquired. The image includes a visual code associated with the part. The visual code is decoded to obtain an identification of at least one unit in the part. It is determined if the target unit is included in the part responsive to identification of a match of the target unit with the identification of the at least one unit. There is further disclosed a corresponding apparatus, assembly, and fault diagnosis device.

12 Claims, 4 Drawing Sheets

(52) U.S. Cl.
CPC ............... *G06T 2207/10004* (2013.01); *G06T 2207/30141* (2013.01); *G06T 2207/30148* (2013.01)

(58) Field of Classification Search
CPC . G06T 2207/10016; G06T 7/001; G06T 7/30; G06T 7/60; G06T 2207/10012; G06T 7/97; G21K 1/00; H04B 1/3838; H05K 9/0071; H01J 37/3405; H01J 37/3497; H04N 5/23206; H04N 5/23212; H04N 5/23293; H04N 2013/0074; H04N 2201/325; H04N 2201/3277; H04R 1/023; G06F 8/20; G06F 17/30371; G06F 8/34; G06F 8/38; G06F 3/013; G06F 3/0482; G06F 17/3028; G06F 11/0727; G06F 11/079; G06F 11/0775; G06F 11/0787; G06F 11/2094; G06F 11/2294; G06F 11/326; G05B 2219/23248; G05B 2219/23258; G05B 2219/23273; F24F 1/00; B25J 9/1697; G06K 9/00208; G06K 9/6202; G06K 19/08; H04L 67/06; B01J 2219/0061; B01J 2219/00612; B01L 3/5025; B01L 3/502792; G07F 17/0092; G07F 7/1025; A63B 24/0021; A63B 63/06; B67D 1/0875; G08G 5/0082; G08G 7/00; G11B 27/326; G11B 27/34; G06Q 10/06; G07G 1/0045
USPC ................. 382/141; 702/182, 183, 185, 188
See application file for complete search history.

(56) References Cited

U.S. PATENT DOCUMENTS

| | | | |
|---|---|---|---|
| 7,561,875 B1 | 7/2009 | Eberle | |
| 7,568,122 B2 | 7/2009 | Mechalke et al. | |
| 7,627,454 B2* | 12/2009 | LaComb | G05B 23/0229 702/182 |
| 7,661,602 B2 | 2/2010 | Kubota et al. | |
| 7,684,961 B1* | 3/2010 | Robillard | G06F 11/326 702/183 |
| 8,230,261 B2 | 7/2012 | Calkin | |
| 8,810,400 B2* | 8/2014 | Friedlander | G06Q 10/08 283/101 |
| 9,317,924 B2* | 4/2016 | Aratani | G06T 7/0075 |
| 2003/0091960 A1* | 5/2003 | Rosa | F41G 3/2655 434/21 |
| 2004/0153992 A1* | 8/2004 | Molina-Moreno | G06F 8/35 717/105 |
| 2005/0090978 A1* | 4/2005 | Bathory | G08G 5/0013 701/469 |
| 2005/0153262 A1* | 7/2005 | Kendir | F41G 3/2655 434/21 |
| 2007/0150092 A1* | 6/2007 | Ohmura | G06F 19/3462 700/231 |
| 2007/0187234 A1* | 8/2007 | Kadokura | C23C 14/3464 204/298.02 |
| 2008/0034310 A1* | 2/2008 | Kodosky | G05B 19/0426 715/769 |
| 2009/0017903 A1* | 1/2009 | Mizoguchi | G07F 17/3202 463/20 |
| 2009/0020617 A1* | 1/2009 | Kwon | B41J 3/01 235/494 |
| 2009/0125875 A1* | 5/2009 | Schmitter | G06F 8/20 717/101 |
| 2010/0172509 A1* | 7/2010 | Shim | H04R 1/023 381/71.1 |
| 2012/0128240 A1* | 5/2012 | Rothschild | G06K 9/00 382/165 |
| 2012/0258436 A1* | 10/2012 | Lee | G09B 19/00 434/362 |
| 2013/0250184 A1* | 9/2013 | Leclerc | A63J 5/02 348/744 |
| 2013/0329068 A1* | 12/2013 | Hamanaka | H04N 5/23293 348/218.1 |
| 2014/0282783 A1* | 9/2014 | Totten | H04L 12/2885 725/111 |

OTHER PUBLICATIONS

Anonymous, System and Method for Performing Light Path Diagnostics Using RFID, IP.com, Jan. 27, 2011.
Christiansen et al., Physical FRU Location Identification, IP.com, May 1, 1985.
List of IBM Patents or Applications Treated as Related, Oct. 2015.

* cited by examiner

METHOD FOR LOCATING A UNIT IN AN ASSEMBLY

CROSS-REFERENCE TO RELATED APPLICATION

This application is a continuation patent application of U.S. patent application Ser. No. 14/697,899, filed Apr. 28, 2015, titled "Method and Apparatus for Locating Unit in Assembly", which is hereby incorporated by reference, which claims priority under 35 U.S.C. § 119 from Chinese Patent Application No. 201410178187.4 filed Apr. 29, 2014, the entire contents of which are incorporated herein by reference.

BACKGROUND

The present embodiment(s) relates to fault diagnosis, and more specifically, to a method and apparatus for locating a unit in an assembly.

At present, many electronic and/or mechanical devices have a self-diagnosis function for detecting whether hardware units and/or software units in some assemblies of a device are in a normal working state. The term "unit" used here refers to a component providing a corresponding function in a device; the term "assembly" refers to an apparatus composed of one or more such units. By way of example, an assembly may be a motherboard in an electronic device, while a unit may comprise various slots, ports and other components on the motherboard.

One important aspect of the diagnostic function is alarming a human user (e.g., a technical expert or engineer) when detecting a fault or abnormality occurring to some unit, such that the user can identify and locate the failing unit. As an example, the light path diagnostics is a common diagnostics technology in the industry. Generally, a light emitting element such as light emitting diode (LED) is arranged nearby a specific unit or module in the device. When a unit is detected to have a fault, an associated LED may be driven to emit light so as to generate an intuitive prompt, such that the human user can identify and locate the failing unit.

Light path diagnostics has some drawbacks, e.g., the LED per se needs a battery or super capacity to supply power, which increases the total power consumption of the device. Moreover, the LED has a certain service life, which increases costs for LED maintenance and replacement. Moreover, when the LED per se fails, it would be impossible to identify a corresponding failing unit. Additionally, it inevitably increases the difficulty and complexity of wiring to equip LEDs for so many units, which might also increase the volume and weight of the device. These drawbacks are particularly outstanding for those portable and small devices.

Besides the purpose of fault diagnosis, it is likewise required to identify or locate a target unit in an assembly in many other cases. For example, even no units in the assembly fail, a technician may likewise need to locate any target unit in the assembly for various purposes such as maintenance, overhaul, and replacement.

Therefore, it is desirable in the art to provide a solution for locating a unit in an assembly more effectively.

SUMMARY

In order to solve the above and other potential problems, a solution is provided for locating a unit(s) in an assembly.

In one aspect, a method is provided for locating a target unit in an assembly. Identification of a target unit in the assembly is obtained. An image of at least a part of the assembly is acquired. The image includes visual code associated with the part. The visual code is decoded to obtain an identification of at least one unit in the part. Responsive to the identification of the target unit matching the identification of the at least one unit, determining that the target unit is included in the part.

It would be understood through the following description that according to the embodiments, when it is needed to locate a specific target unit in an assembly, the assembly may provide an identification of the target unit. Besides, one or more visual codes are arranged in advance in the assembly. Each visual code is associated with a part of the assembly and at least encodes the identifications of respective units in the part. An image of the assembly portion including such visual codes may be acquired, and by decoding the visual codes, identifications of respective units in the corresponding part are obtained. Next, the location of the target unit may be determined through matching the unit identification. In this way, a unit can be identified and located fast and accurately. Moreover, the costs associated with the locating unit can be significantly decreased. Other features and advantages will become easily comprehensible through the description below.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In the drawings, the same or similar reference numerals are used to indicate the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
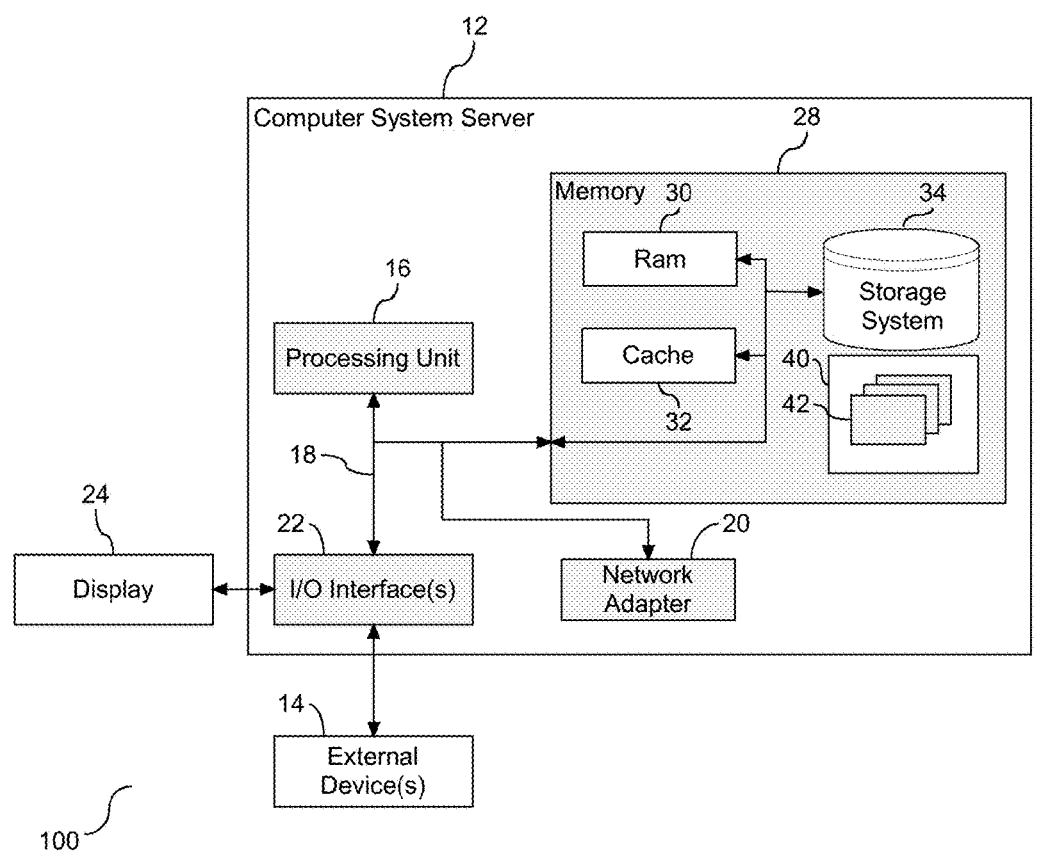
FIG. 1 shows an exemplary computer system which is applicable to implement the embodiments.

Referring now to FIG. 1, in which an exemplary computer system/server (12) which is applicable to implement the embodiments is shown. Computer system/server (12) is only illustrative and is not intended to suggest any limitation as to the scope of use or functionality of embodiments described herein.

As shown in FIG. 1, computer system/server (12) is shown in the form of a general-purpose computing device. The components of computer system/server (12) may include, but are not limited to, one or more processors or processing units (16), a system memory (28), and a bus (18) that couples various system components including system memory (28) to processor (16).

Bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server (12) typically includes a variety of computer system readable media. Such media may be any available media that is accessible by computer system/server (12), and it includes both volatile and non-volatile media, removable and non-removable media.

System memory (28) can include computer system readable media in the form of volatile memory, such as random access memory (RAM) (30) and/or cache memory (32). Computer system/server (12) may further include other removable/non-removable, volatile/non-volatile computer system storage media. By way of example only, storage system (34) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (18) by one or more data media interfaces. As will be further depicted and described below, memory (28) may include at least one program product having a set (e.g., at least one) of program modules that are configured to carry out the functions of the embodiments.

Program/utility (40), having a set (at least one) of program modules (42), may be stored in memory (28) by way of example, and not limitation, as well as an operating system, one or more application programs, other program modules, and program data. Each of the operating system, one or more application programs, other program modules, and program data or some combination thereof, may include an implementation of a networking environment. Program modules (42) generally carry out the functions and/or methodologies of embodiments as described herein.

Computer system/server (12) may also communicate with one or more external devices (14) such as a keyboard, a pointing device, a display (24), etc.; one or more devices that enable a user to interact with computer system/server (12); and/or any devices (e.g., network card, modem, etc.) that enable computer system/server (12) to communicate with one or more other computing devices. Such communication can occur via Input/Output (I/O) interfaces (22). Still yet, computer system/server (12) can communicate with one or more networks such as a local area network (LAN), a general wide area network (WAN), and/or a public network (e.g., the Internet) via network adapter (20). As depicted, network adapter (20) communicates with the other components of computer system/server (12) via bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

Hereinafter, the embodiments will be described in detail. According to the exemplary embodiments, when a unit of an assembly of a device fails, or when it is desired to locate a target unit in an assembly out of any other purposes, an identification of the target unit may be provided. Additionally, one or more visual codes are pre-arranged in the assembly, each visual code being associated with one part of the assembly and at least encoding identifications of respective units in the part. For the target unit, an image of an assembly part including such visual codes may be acquired, and identifications of respective units in the corresponding parts can be obtained by decoding the visual codes. Then, the location of the target unit may be determined by matching the unit identification. In this way, the target unit can be identified and located fast and accurately. Moreover, the costs associated with locating the unit can be significantly reduced.

Only for the sake of discussion, a failing unit in an assembly may be described as an example of a to-be-located target unit hereinafter. However, it should be understood that it is only exemplary, not intended to limit the scope of the present embodiments in any manner. On the contrary, the embodiments are applicable for any application scenario that needs to locate a unit in an assembly.

Figure 2:
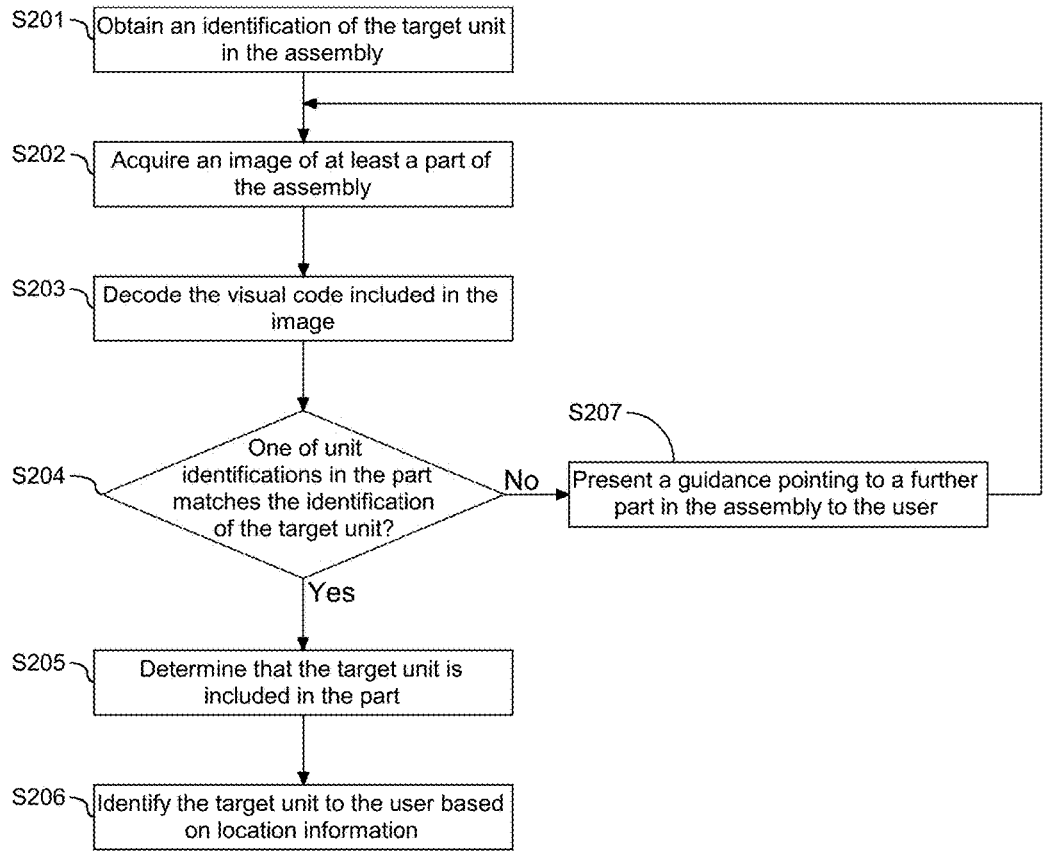
FIG. 2 shows a schematic flow chart of a method for locating a unit in an assembly.

Now, refer to FIG. 2, in which a flow chart of a method for locating a unit in an assembly according to the embodiments is presented. As an example, when the embodiments are used to locate a failing unit in an assembly, the method (200) for example may be performed by a fault diagnosis device used by a technician in charge of maintenance or overhaul. For example, in some embodiments, a portable mobile device may act as the fault diagnosis device and be configured to perform the method (200), which will be described in detail hereinafter.

For the convenience of discussion, a device including or using an assembly will be called a "host device" hereinafter. As described above, the term "assembly" used here refers to an apparatus composed of a plurality of units in a host device, e.g., a motherboard in a computer system. The term "unit" refers to a component for providing a specific function included in the assembly. As an example, a unit may comprise a field replaceable unit (FRU). Examples of FRU include, but not limited to, various pluggable devices coupled to a central processing unit (CPU), a memory, a graphic acceleration card, an audio card, and the like.

As shown in FIG. 2, at step (S201), an identification of a to-be-located target unit in an assembly is obtained. For example, in some embodiments, when the target unit is a failing unit, information like an identification of the failing assembly may be provided when failure of one or more units is detected. In some embodiments, the identification of the target unit may be provided by the assembly per se. Alternatively, the identification of the target unit may also be provided by any other appropriate apparatus in the host device.

According to the embodiments, examples of an identification of a target unit include, but not limited to, an index, a serial number, a name or any other appropriate identification information of the unit.

Optionally, in some embodiments, information about the assembly per se may also be obtained, e.g., the identification, type, serial number, manufacturer, manufacturing date and the like of the assembly. Alternatively or additionally, in some embodiments, information about the host device where the assembly is located may also be obtained. For example, suppose that the assembly is a motherboard, the information about the host device may include an identification, type, serial number, manufacturer, manufacturing date and the like of the host computer using the motherboard.

According to the embodiments, at step (S201), identification and other optional information of the target unit may be obtained through various manners. For example, in some embodiments, an assembly in the host device may be equipped with one or more display devices. Such display devices for example may be integrated with the assembly, such that when it is needed to locate a specific target unit in the assembly (e.g., when a failing unit is detected), the identification and other optional information of the target unit may be displayed on such a display device. Correspondingly, at step (S201), the identification and any other information of the target unit may be read from the display device.

In particular, in some embodiments, the display device for displaying an identification of a target unit may be a low-power-consumption power-saving type display device. Examples of such power-saving display device include, but not limited to, an electronic ink (E-ink) display. For example, suppose the assembly is a motherboard, then one or more associated E-ink displays may be integrated on the motherboard. As an example, when a unit on a motherboard fails, failure information such as the identification of the failing unit may be presented on a corresponding E-ink display. As already known, the E-ink display does not consume power when presenting contents, which only consumes power when refurbishing the contents. In this way, the total power consumption level may be effectively lowered.

In some embodiments, the identification and other optional information of the target unit may be directly presented on a display device associated with the assembly. In such an embodiment, at step (S201), a device (e.g., a fault diagnosis device) performing the method (200) may directly read and identify the identification and other optional information of the target unit as presented on the display device, and such information may be input into the fault diagnosis device using any appropriate interaction technology. Correspondingly, the fault diagnosis device may receive the identification and other optional information of the target unit from the user at step (S201).

Alternatively, the identification and other optional information of the target unit may also be first encoded into a visual code. This visual code is in turn presented on the display device associated with the assembly. According to the embodiments, examples of the visual code include, but not limited to, quick response (QR) codes, bar codes, and the like. Please note that any technology cable of encoding and/or compressing information through graphics/image/video may be used in combination with the embodiments, and the scope is not limited in this aspect. Correspondingly, in this embodiment, such visual codes may be read and decoded at step (S201) to obtain the identification and other optional information of the target unit.

Alternatively or additionally, in some embodiments, at step (S201), the identification and other optional information of the target unit may be received from one or more ports associated with the assembly. For example, in some embodiments, when the target unit is a failing unit in the assembly, responsive to detection of the failing unit in the assembly, the identification and other optional information of the target unit may be transferred to the fault diagnosis device or any other appropriate device through a communication port such as a universal serial bus (USB) associated with the assembly.

Alternatively or additionally, in some embodiments, the assembly may provide the identification and other optional information at least partially by means of a light emitting device (e.g., LED, etc.). For example, the assembly may drive the light emitting device associated with the target unit to emit light to thereby provide the identification of the target unit. Alternatively, the light emitting device may be shared with a plurality of units on the assembly. At this point, different light emitting modes (e.g., light emitting time, flickering pattern, and the like) may be used to indicate the identification of the target unit. Correspondingly, in this embodiment, at step (S201), the identification of the target unit may be automatically identified by sending and identifying the light emitted from the light emitting unit. Alternatively or additionally, the identification of the target unit may also be determined manually by the user based on the light emitted by the light emitting device, and inputted into the apparatus performing the method (200).

In particular, in an embodiment of using the light emitting device to indicate the identification of the target unit, additional information associated with the assembly and/or host device may be provided together with the identification of the target unit, e.g., a predefined light emitting pattern of the light emitting device. Alternatively, in other embodiments, such additional information may also be provided independently. For example, in some embodiments, the assembly may be associated with one or more visual codes. For the convenience of discussion, the visual codes associated with the assembly (not a part thereof) may be called "assembly visual codes." As an example, suppose the assembly is a motherboard, one or more visual codes (e.g., QR codes) may be arranged on the motherboard. Information associated with the assembly (a motherboard in this example) and/or host device may be pre-encoded in the assembly visual codes. Therefore, at step (S201), additional information associated with the assembly and/or host device may be obtained by reading and decoding the assembly visual codes.

Next, the method (200) proceeds to the step (S202), where an image of at least a part of the assembly is acquired.

According to the embodiments, the assembly may be pre-partitioned into one or more parts, each part comprising one or more units in the assembly. Please note that in the context of the present disclosure, a part does not necessarily include a complete unit. In other words, suppose only a part of the unit A is included in part B of the assembly, it may be regarded that the unit A is completely included in the part B.

Moreover, according to the embodiments, each part of the assembly may include associated visual codes, e.g., QR codes, bar codes, and the like. The visual codes may be integrated into a corresponding part. As an example, when the assembly is a motherboard, the motherboard may be pre-partitioned into a plurality of regions, each region including one or more elements on the motherboard. Each region may be arranged therein with corresponding visual codes encoding information of an element in the art. Such visual codes may be provided by a manufacture or provider of the host device and/or assembly.

According to the embodiments, visual codes associated with a certain part in the assembly at least encode identifications of respective units in the part. Alternatively, in some embodiments, the visual codes may also indicate additional information of the units in the part, e.g., location information, model, production date, and the like.

Figure 3:
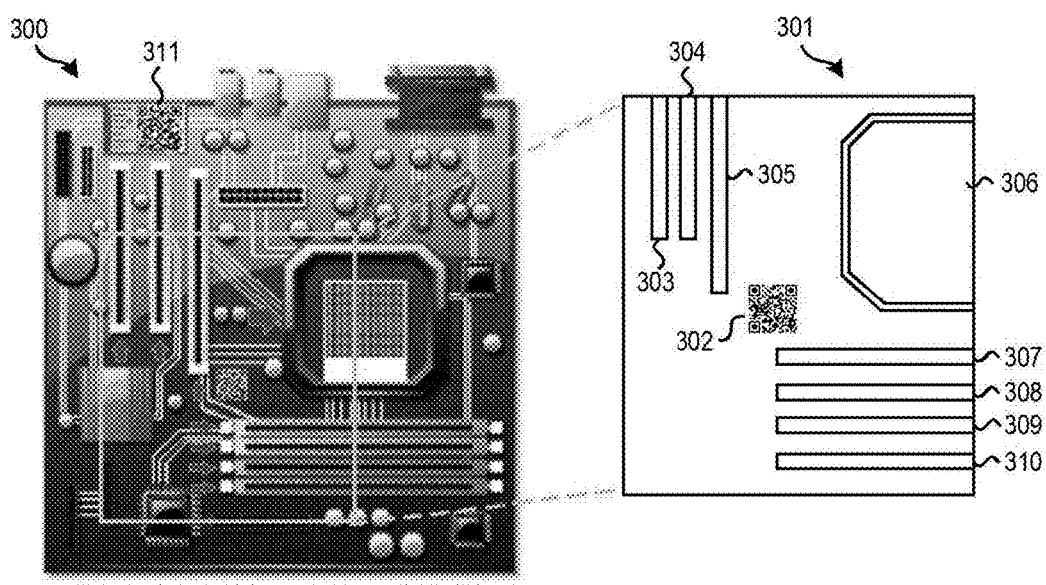
FIG. 3 shows a schematic diagram of a part of an assembly and its associated visual codes.

As an example, FIG. 3 shows a schematic diagram of a part (301) of an assembly (300) and its associated visual code (302). In the example of FIG. 3, the assembly (300) is a motherboard in a computing device. The part (301) of the motherboard (300) is associated with the visual code (302). In this example, the visual code (302) may be a QR code arranged in the part (301) to indicate identifications of respective units (303)-(310) in the part (301). Optionally, the visual code (302) may also indicate the locations of one or more units in the units (303)-(310) and/or any other information about fault diagnosis.

Additionally, it may also be seen from FIG. 3 that the assembly (300) comprises the above described assembly visual code (311). The assembly visual code (311) for example may be used to include information about the assembly (300) and the host device where the assembly (300) is located, and/or any other information.

According to the embodiments, if the apparatus (e.g., a fault diagnosis device) performing the method (300) has an image capturing module, then at step (S202), the apparatus may directly capture images of one or more parts of the assembly. Please note that the term "image capturing module" here not only includes an image shooting device such as a camera, a video camera, and the like, but also includes a scanning module for scanning and/or identifying the visual codes, e.g., a scanner for a QR code, a bar code, and the like. If the apparatus performing the method (200) does not have an image capturing function, it is possible to use another image capturing device to capture an image of a part of the assembly, and the fault diagnosis device can receive the image at step (S202).

In particular, it should be understood that according to the embodiments, the image acquired at step (S202) does not necessarily include a complete part. On the contrary, it is only necessary that the acquired image include a region including a visual code in the part.

Next, the method (200) proceeds to step (S203), where the visual code included in the image acquired at step (S202) is decoded to obtain identifications of respective units in the part associated with the visual code. In particular, if it is determined that the image does not include any visual code, then the user may be prompted to re-acquire an image of other part of the assembly, and the method (200) may return to step (S202) to continue execution.

In particular, in some embodiments, the acquired original image may be calibrated. For example, in some cases, the original image might not be a top view of the assembly part in consideration, which might cause potential failure to the visual code in the image when decoding. In this way, in some embodiments, the image may be calibrated through rotation, panning and/or scaling, thereby at least obtaining the top view of the visual code region. Specifically, in some embodiments, calibration may be executed with respect to the whole original image. Alternatively, in order to accelerate the processing speed, it is allowed to only perform calibration with respect to the image region including the visual code, thereby obtaining the top view of the visual code for decoding.

It should be understood that calibration of the image in decoding is optional. For example, when the image acquired at step (S202) has already been a top view of the assembly part, the calibration operation may be omitted. Moreover, the calibration on the image is not limited to affine transformation. On the contrary, any technology capable of calibrating or adjusting the image angle may be used in combination with the embodiments, regardless of whether the technology is currently known or future developed.

Next, at step (S204), the identification of the target unit as acquired at step (S201) is matched to identifications of respective units as derived from decoding at step (S203) to determine whether the target unit is included within the current part in question.

According to the embodiments, if it is determined at step (S204) that one of unit identifications as decoded at step (S203) matches the unit of the target unit (branch "yes"), then it may be determined at step (S205) that the target assembly is included in the current part. Correspondingly, in some embodiments, the method (200) may proceed to step (S206), where the target unit is identified to the user based on the location information of the matching unit. As mentioned above, in some embodiments, the visual code associated with a part of the assembly may not only include identifications of respective units in the part, but also may include location information of these units.

In such an embodiment, a location of the target unit may be decoded out from the visual code included in the image acquired at step (S202). The location of the unit for example may be represented as a coordinate of the unit in the assembly or a part thereof. In some embodiments, the location information of the unit may be decoded together with the unit identification at step (S203). Alternatively, in some other embodiments, the location information of the unit may also be separately decoded, for example, at step (S206) or before. Afterwards, visual indication and/or numerical value of the location of the target unit may be presented to the user.

On the other hand, if it is determined at step (S204) that none of the identifications of all units in the current part in question matches the identification of the target unit as obtained at step (S201) (branch "No"), then it may be determined that the target unit is not in the current part. At this point, the method (200) may proceed to step (S207), where the user is prompted to acquire an image of other part of the assembly so as to continue identifying the target unit.

In particular, in some embodiments, a guidance of a further part on the assembly may be provided to the user at step (S206). It would be understood that it is pre-determined by a manufacturer or provider of the host device in which parts of the assembly are arranged visual codes. Therefore, the locations of respective parts including the visual code in the assembly and their relative locations are known. In other words, there is predefined location information of the visual codes associated with respective parts in the assembly. According to the embodiments, such predefined location information may be directly encoded in visual codes associated with respective parts, encoded in the assembly visual codes, and/or saved at any other accessible locations. In this way, in some embodiments, guidance (e.g., arrow) pointing to a further part in the assembly may be provided to the user based on predefined location information of a visual code associated with the further part in the assembly. In this way, the user may locate that further part of the assembly based on the guidance. At this point, the method (200) may return to step (S202) to acquire images of other parts in the assembly.

It should be noted that steps (S206) and (S207) in method (200) are optional. In some embodiments, when the target unit is found, the user may be simply prompted. The user then may locate the target unit manually in the current part. On the other hand, when it is determined that the target unit is not in the current part, the user may be simply notified, without providing any guidance information.

Figure 4:
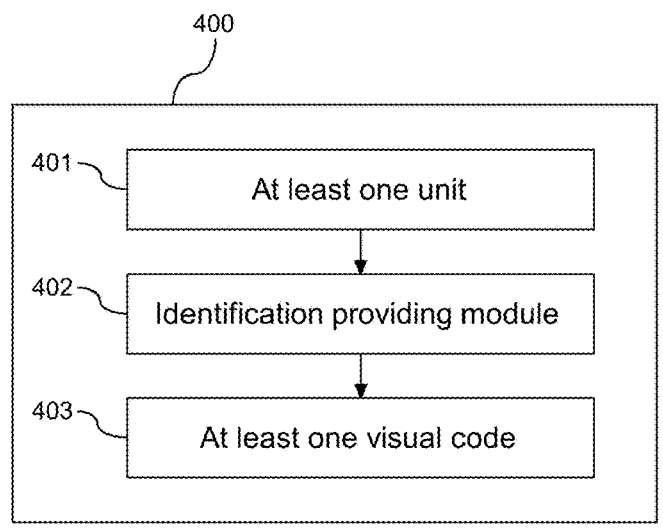
FIG. 4 shows a schematic block diagram of an assembly.

FIG. 4 shows a block diagram of an assembly (400) according to the embodiments. As shown in FIG. 4, the assembly includes at least one unit (401), an identification providing module (402), and at least one visual code (403).

According to the embodiments, the identification providing module (402) may be configured to provide an identification of any target unit in at least one unit (401). For example, when the embodiments are used for fault detection, the identification providing module (402) may be configured to provide an identification of a failing unit when the failing unit is detected from among at least one unit (401). Further, the identification providing module (402) or other modules may optionally provide information about the assembly (400) or the host device where the assembly (400) is located, as described above.

In particular, in some embodiments, the identification providing module (402) of the assembly (400) may include at least one of the following: a display driving module configured to drive a display device associated with the assembly to display the identification; a light emitting device driving module configured to drive a light emitting device associated with the target unit to emit light so as to provide the identification; and a communication port driving module configured to drive a communication port associated with the assembly to transmit the identification.

It should be noted that according to the embodiments, the display device, light emitting device and/or communication port may be integrated on the assembly (400). Alternatively, one or more of them may also be independent of the assembly (400). The scope of the present embodiments is not limited in this aspect.

According to the embodiments, each of the at least one visual code (403) is associated with a specific part of the assembly (400) and at least indicates identifications of one or more units located in the part. Optionally, as described above, the visual code (403) may also include other relevant information of the unit, e.g., location. In some embodiments, the visual code (402) may be a QR code. Alternatively or additionally, the visual code (402) may also be any other visual code such as bar code. In particular, in some embodiments, each of the visual codes may also include location information of respective units located in the associated part.

Figure 5:
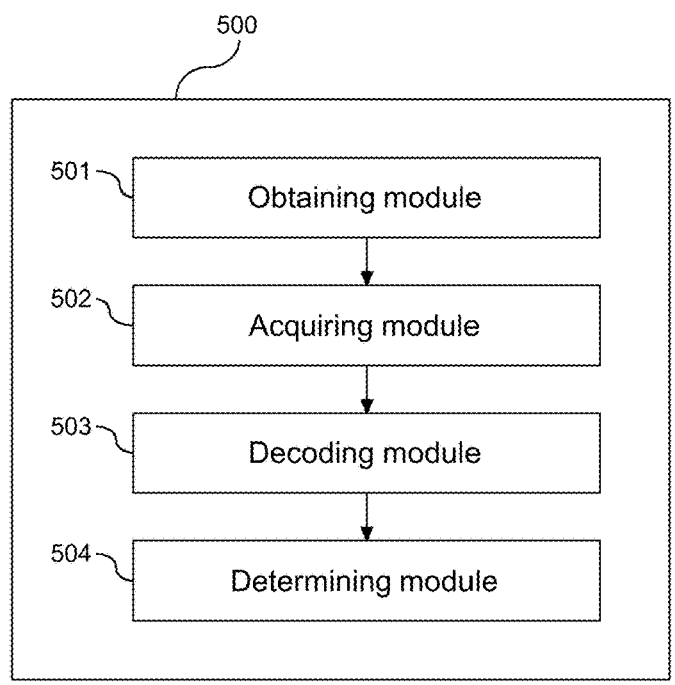
FIG. 5 shows a schematic block diagram of an apparatus for locating a unit in an assembly.

Refer to FIG. 5, in which a block diagram of an apparatus (500) for locating a unit in an assembly according to the embodiments. As shown in the figure, according to the embodiments, the apparatus (500) comprises: an obtaining module (501) configured to obtain an identification of a target unit in the assembly; an acquiring module (502) configured to acquire an image of at least a part of the assembly, which image includes visual code associated with the part; a decoding module (503) configured to decode the visual code to obtain an identification of at least one unit in the part; and a determining module (504) configured to determine that the target unit is included in the part responsive to the identification of the target unit matching the identification of the at least one unit.

In some embodiments, the obtaining module (501) may comprise at least one of the following: a first obtaining module configured to read the identification from a display device associated with the assembly; a second obtaining module configured to determine the identification based on light emitted by a light emitting element associated with the target unit; and a third obtaining module configured to receive the identification through a communication port associated with the assembly.

In some embodiments, the obtaining module is further configured to obtain additional information about at least one of the assembly and the host device where the assembly is located. In some embodiments, the additional information may be encoded in the assembly visual code associated with the assembly.

In some embodiments, the apparatus (500) may also comprise: an image calibrating module configured to calibrate the acquired image to at least obtain a top view of the visual code for the decoding.

In some embodiments, the visual code includes location information of the at least one unit in the part. At this point, the apparatus (500) may also comprise: an identifying module configured to identify the target unit for the user based on the location information responsive to determining that the target unit is included in the part.

In some embodiments, the apparatus (500) may also comprise: a guiding module configured to provide guidance pointing to a further part of the assembly to the user responsive to determining that the target unit is not included in the part. In some embodiments, the guidance may be provided based on predefined location information of a visual code associated with the other part.

In some embodiments, the visual code associated with the part may include a QR code.

Please note that for the sake of clarity, FIG. 5 does not show optional modules or sub-modules included in the apparatus (500). However, it should be understood that all features and operations as described above are applicable to the system (500), respectively, which will not be detailed here. Moreover, the partitioning of modules or sub-modules in the apparatus (500) is not restrictive, but exemplary, intended to logically describe its main functions or operations. The function of one module may be implemented through a plurality of modules; on the contrary, a plurality of modules may be also implemented by one module. The scope is not limited in this aspect.

Moreover, the modules included in the apparatus (500) may be implemented in various manners, including software, hardware, firmware or any combination thereof. For example, in some embodiments, the apparatus (500) may be implemented using software and/or firmware. Alternatively or additionally, the system (500) may be implemented partially or completely based on hardware. For example, one or more modules in the system (500) may be implemented as an integrated circuit (IC) chip, an application-specific integrated circuit (ASIC), a system on chip (SOC), a field programmable gate array (FPGA), etc. The scope of the present embodiments is not limited in this aspect.

As described above, the solution for locating units in the assembly according to the embodiments is applicable to the identification of the fault unit. Embodiments include a fault diagnosis device. According to the embodiments, the fault diagnosis device may be any suitable device including the apparatus (500) as shown in FIG. 5. In operation, the apparatus (500) may be configured to perform the method (200) as discussed with reference to FIG. 2. For example, in some embodiments, the fault diagnosis device may be implemented as a handheld mobile device such as a mobile phone, personal digital assistance (PDA), tablet computer, laptop computer, and so forth. Alternatively, the fault diagnosis device may be implemented as a fixed device such as the computer system (12) as discussed with reference to FIG. 1.

The present embodiments may be employed in a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for locating a target hardware component in an assembly, comprising:
   obtaining, using a processor in communication with memory, an identification of the target hardware component in the assembly;
   acquiring, using the processor, an image of at least a part of the assembly, the image including a visual code associated with the part, wherein the visual code includes location information of at least one hardware component in the part;
   decoding, using the processor, the visual code to obtain an identification of the at least one hardware component in the part;
   responsive to the identification of the target hardware component matching the identification of the at least one hardware component, determining, using the processor, that the target hardware component is included in the part; and
   responsive to determining that the target hardware component is included in the part, identifying, using the processor, the target hardware component based on the location information.

2. The method according to claim 1, wherein obtaining an identification of the target hardware component in the assembly comprises at least one of:
   reading the identification from a display device associated with the assembly;
   determining the identification based on light emitted by a light emitting device associated with the target hardware component; and
   receiving the identification via a communication port associated with the assembly.

3. The method according to claim 1, further comprising:
   obtaining additional information related to at least one of the assembly and a host device where the assembly is located, the additional information encoded in an assembly visual code associated with the assembly.

4. The method according to claim 1, wherein decoding the visual code to obtain an identification of at least one unit in the part comprises:
   calibrating the acquired image to at least obtain a top view of the visual code for the decoding.

5. The method according to claim 1, further comprising:
   responsive to determining that the target hardware component is not included in the part, providing guidance pointing to a further part of the assembly to a user.

6. The method according to claim 5, wherein the guidance is provided based on predefined location information of a visual code associated with the further part.

7. The method according to claim 6, wherein the visual code associated with the part includes a quick response (QR) code.

8. The method according to claim 1, wherein acquiring an image of at least a part of the assembly comprises:
   capturing and transmitting an image of a part of the assembly with an imaging device operatively coupled to the processor.

9. The method according to claim 1, wherein the assembly is a motherboard.

10. The method according to claim 1, wherein the visual code is presented on a display device.

11. The method according to claim 10, wherein the display device is an electronic ink display.

12. The method according to claim 1, wherein the visual code includes information selected from the group consisting of: location, model, and production date.

* * * * *